US011937061B2

(12) United States Patent
O'Brien

(10) Patent No.: US 11,937,061 B2
(45) **Date of Patent: *Mar. 19, 2024**

(54) AUDIO TRANSDUCER WITH FORCED VENTILATION OF MOTOR AND METHOD

(71) Applicant: Polk Audio, LLC, Carlsbad, CA (US)

(72) Inventor: Sean O'Brien, Harwood, MD (US)

(73) Assignee: Polk Audio, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,645

(22) Filed: Feb. 14, 2023

(65) Prior Publication Data

US 2023/0199394 A1 Jun. 22, 2023

Related U.S. Application Data

(63) Continuation of application No. 17/278,215, filed as application No. PCT/US2019/051923 on Sep. 19, 2019, now Pat. No. 11,611,830.

(60) Provisional application No. 62/733,332, filed on Sep. 19, 2018.

(51) Int. Cl.

*H04R 9/06* (2006.01)
*H04R 9/02* (2006.01)

(52) U.S. Cl.

CPC ............ *H04R 9/022* (2013.01); *H04R 9/025* (2013.01); *H04R 9/063* (2013.01); *H04R 9/06* (2013.01); *H04R 2209/022* (2013.01); *H04R 2209/041* (2013.01)

(58) Field of Classification Search

CPC .......... H04R 9/022; H04R 9/025; H04R 9/06; H04R 9/063; H04R 2209/022; H04R 2209/041

See application file for complete search history.

(56) References Cited

U.S. PATENT DOCUMENTS

| | | | |
|---|---|---|---|
| 5,042,072 | A | 8/1991 | Button |
| 5,517,573 | A | 5/1996 | Polk et al. |
| 5,878,148 | A | 3/1999 | Alexandrov |
| 5,909,015 | A | 6/1999 | Yamamoto |
| 6,219,431 | B1 | 4/2001 | Proni |
| 6,229,902 | B1 | 5/2001 | Proni |
| 6,430,300 | B1 | 8/2002 | Cox et al. |

(Continued)

OTHER PUBLICATIONS

International Search Report for PCT/US19/51923 dated Jan. 28, 2020, pp. 1-4.

Written Opinion for PCT/US19/51923 dated Jan. 28, 2020, pp. 1-7.

*Primary Examiner* — Huyen D Le

(74) *Attorney, Agent, or Firm* — J. Andrew McKinney, Jr.; McKinney & Associates, LLC

(57) ABSTRACT

A forced ventilation woofer or electromechanical transducer (e.g., 200 or 300) includes a motor structure and voice coil winding support structure or former (203 or 303) configured with a vented annular spacer (e.g., 250) and vented distal pole tip member (e.g., 255) having aligned radial channels aimed to transport heat away from a voice coil (202 or 302) during the transducer's reciprocating movement while providing an extended, linear dynamic range and continuous cooling for the voice coil. A dual magnetic gap embodiment has an inside annular spacer member (e.g., 355A) and a co-planar outside annular spacer member (e.g., 350-O), each made of a thermally conductive steel alloy.

11 Claims, 9 Drawing Sheets

(56) References Cited

U.S. PATENT DOCUMENTS

| | | | | |
|---|---|---|---|---|
| 6,535,613 | B1 * | 3/2003 | Ssutu | H04R 9/022<br>381/397 |
| 6,771,791 | B2 * | 8/2004 | Shelley | H04R 9/022<br>381/397 |
| 6,868,165 | B1 | 3/2005 | Fabian | |
| 6,917,690 | B2 | 7/2005 | Stiles | |
| 8,638,968 | B2 | 1/2014 | Gladwin | |
| 11,611,830 | B2 * | 3/2023 | O'Brien | H04R 9/022 |
| 2001/0031063 | A1 | 10/2001 | Langford et al. | |
| 2003/0081808 | A1 | 5/2003 | Kemmerer | |
| 2004/0086150 | A1 | 5/2004 | Stiles | |
| 2013/0243232 | A1 | 9/2013 | Dimitrov | |
| 2016/0219370 | A1 | 7/2016 | Moro | |
| 2021/0352410 | A1 | 11/2021 | O'Brien | |

* cited by examiner

AUDIO TRANSDUCER WITH FORCED VENTILATION OF MOTOR AND METHOD

PRIORITY CLAIM AND REFERENCE TO RELATED APPLICATIONS

This application is a continuation of and claims priority to related, commonly owned U.S. utility patent application Ser. No. 17/278,215 filed Sep. 19, 2021 entitled Audio Transducer with Forced Ventilation of Motor and Method, which is a national phase application of and claims priority to U.S. PCT application No. PCT/US19/51923 filed Sep. 19, 2019 also entitled Audio Transducer with Forced Ventilation of Motor and Method, which claims the benefit of priority to U.S. provisional patent application No. 62/733,332 filed Sep. 19, 2018, the entire disclosures of which are incorporated herein by reference and priorities of which are claimed. This application is also broadly related to commonly owned U.S. Pat. Nos. 5,517,573 and 8,638,968, the entire disclosures of which are also incorporated herein by reference.

TECHNICAL FIELD OF THE INVENTION

The present invention relates to electromechanical transducers and motor structures, and, more particularly, to loudspeaker driver motor structures and methods for cooling transducer voice coils in loudspeaker applications.

DESCRIPTION OF THE BACKGROUND ART

Moving-coil transducers (e.g., 100) generate considerable heat in their voicecoils due to inherent electrical resistance of the voicecoil and low efficiency of the transducer. This heat can cause a reduction in performance via "power compression" whereby the voicecoil's electrical resistance increases as the drive power increases, leading to a reduction in expected output, as illustrated in the "std. airflow" temperature and power plots of FIG. 1. In more extreme cases, high temperatures can lead to failure. Convection and Conduction are usually the mechanisms used to cool a transducer's voicecoil 102. FIG. 2 illustrates a typical (prior art) woofer 100 in which the convective cooling from airflow over the voicecoil is restricted by the drivers gap region geometry. Air is forced to flow through the narrow regions between the voicecoil and washer on one side, or voicecoil and pole on the other. These paths are very narrow and constrict the airflow considerably, limiting the amount of cooling available.

High power signals driving a speaker's diaphragm or cone into extreme excursions can cause the (usually pistonic) motion of the diaphragm to become mis-aligned when driven by more challenging audio signals. Typical prior art woofers utilize circular baskets supporting frustoconical driver diaphragms having a circular peripheral edge carrying an annular surround or suspension, as shown in FIG. 2. In order to better explain the present invention, the conventional loudspeaker driver 100 is shown and some nomenclature used by those having skill in the art will be reviewed. Referring to FIG. 2, a cylindrical voice coil bobbin 103 has a conductive voice coil 102 wound around its outer circumferential wall and is affixed to the center of a frusto-conical diaphragm 101 or cone. The diaphragm 101 and the voice coil bobbin 103 are fixed to an inner peripheral edge of an annular or ring-shaped surround or edge 108 and to an annular damper or "spider" 109 having a selected compliance and stiffness. The outer peripheral ends of the surround 108 and the spider 109 are fixed to a rigid supportive frame or basket 112 that also carries a three-piece magnetic circuit 107, so that the frame 112 supports the diaphragm 101 and voice coil bobbin 103, which are pistonically movable within the frame along the central axis of bobbin 103. A centered "dust" cap 113 is fixed on the diaphragm 101 to cover the hole at the center of the diaphragm 101 and moves integrally with the diaphragm 101.

The edge 108 and damper 109 support the voice coil 102 and voice coil bobbin 103 at respective predetermined positions in a magnetic gap of the magnetic circuit 107, which is constituted of a magnet 104, a plate or washer 105, a pole yoke 106 including a central, axially symmetrical pole piece 115. With this structure, the diaphragm 101 is elastically supported without contacting the magnetic circuit 107 and can vibrate like a piston in the axial direction within a predetermined amplitude range.

The first and second ends or leads of the voice coil 102 are connected to the respective ends of first and second conductive lead wires (not shown) which are also connected to first and second terminals (not shown) carried on frame 112. When an alternating electric current corresponding to a desired acoustic signal is supplied at the terminals to voice coil 102 through the lead wires, the voice coil 102 responds to a corresponding electro-motive force and so is driven axially in the magnetic gap of the magnetic circuit 107 along the piston vibration direction of the diaphragm 101. As a result, the diaphragm 101 vibrates together with the voice coil 102 and voice coil bobbin 103, and converts the electric signals to acoustic energy, thereby producing acoustic waves such as music or other sounds.

Returning to the specifics of the conventional speaker's voice coil gap, the magnetic field or "B" field acting on the voice coil 102 is generated in the annular magnet 104, and the lines of flux pass from magnet 104, through front plate or washer 105, across the annular magnetic gap to the peripheral upper edge of pole piece 115, down through pole piece 115, radially out through yoke 106 and then back into magnet 104, forming a closed loop of magnetic flux. The field strength in the magnetic gap is preferably very high, and so the radial distance across the magnetic gap is something most speaker designers seek to minimize. Narrow and efficient magnetic gaps create other problems, however, because the close mechanical tolerances of a tight magnetic gap require the outer winding surfaces of voice coil 102 to reciprocate in and out in very close proximity to the inner edge of top plate 105. If, during extreme excursions or when expanding due to resistance heating, coil 102 should rub or abrade against the inner edge of top plate 105, then voice coil 102 destroys itself and the loudspeaker fails catastrophically.

Loudspeaker or woofer failure can be often attributed to these types of thermal or mechanical overloading problems. Substantial amounts of power are required to provide very high sound pressure levels, and signals having such power require very large current flow through voice coil conductors, thus generating substantial amounts of heat and driving the woofer's diaphragm to extreme excursions. Those extreme excursions generate extreme mechanical loads on the diaphragm and its supportive suspension. In competitions, operators seek the loudest possible playback and often over-drive the loudspeaker drivers, causing voice coils to burn out or open circuit.

Returning to first principles, the function of a loudspeaker is to convert electrical energy to an analogous acoustical energy. This conversion process takes place in two steps. The first step is the conversion from electrical energy to mechanical energy. The second step is a conversion from mechanical energy to acoustical energy. The first step consists of generating a mechanical displacement proportional to the electrical input signal. The second step consists of coupling the mechanical displacement of the system to the surrounding air via some mechanism, such as forced movement of diaphragm 101. The class of loudspeakers known as electro-dynamic employs a combination of permanent magnet (e.g., 104) and electromagnet to produce the conversion of electrical to mechanical energy.

The permanent magnetic structure in this type of loudspeaker (e.g., 104) utilizes a permanent magnetic material, such as neodymium iron boron, aluminum nickel cobalt, or other rare earth or ceramic materials, that is placed in a "magnetic circuit" consisting of a plate of low carbon steel (e.g., 105) on the north magnetic pole of the permanent magnet and another plate of low carbon steel (e.g., 106) on the south magnetic pole of the permanent magnet. Either the plate on the north magnetic pole or the plate on the south magnetic pole is shaped to provide a small magnetic gap. The magnetic gap is usually annular but need not necessarily be of an annular geometry to be functional. The "magnetic gap" then has a high magnetic field strength. The low carbon steel plates act to concentrate the magnetic field in that volume of space known as the magnetic gap.

The electromagnet portion of the transducer is provided by voice coil 102 which consists of a coiled length of electrical conductor suspended in that magnetic gap. When a time varying electrical current flows through the conductor a magnetic field is produced around the wire and that magnetic field is proportional to the magnitude of the electrical current flowing through the wire in the voice coil. If the permanent magnetic gap has an annular geometry then the electromagnet coil may be immersed into the permanent magnetic gap. This gives rise to a force of interaction between the permanent magnetic field and the electromagnetic field. This force is known as the Lorentz force and is shown in algebraic form as:

$$F=BLi \quad (1)$$

where F is the force of interaction between the two magnetic fields. B is the magnitude of the permanent magnetic field and L is the length of wire immersed in the permanent magnetic field and associated with the coil. In this equation, "i" is the magnitude of the electrical current flowing thru the voice coil's wire.

The force of interaction between the permanent magnetic field and the electro-magnetic, or coil, will produce an acceleration in accordance with Newton's laws of motion.

The motor structure 107 shown in FIG. 2 is typical for loudspeaker drivers with cone diaphragms, such as woofers or subwoofers. In the exemplary structure of FIG. 2, the force of interaction will produce a physical displacement of the voice coil. This physical displacement will be a function of the polarity of the permanent magnetic field and the polarity of the time varying electrical current flowing thru the voice coil. The direction of the voice coil displacement will be either up or down along the central axis 140.

The ability of the loudspeaker to convert electrical signals to proportional mechanical displacements and subsequently to acoustical energy is often referred to as the conversion efficiency of the transducer, or loudspeaker (e.g., 100). The conversion efficiency is proportional to Lorentz force as well as the total moving mass of the loudspeaker, including voice coil, cone, dust cap, and all parts of the transducer that move relative to the permanent magnet structure and frame. The efficiency of loudspeakers, like all transducers, can be rated as a percentage of the input power to the output power. Typical loudspeakers can range from less than 1% efficient to over 30%. The conversion efficiencies approaching 30% are for a specific type of loudspeaker referred to as compression driver. Typical (non compression driver) loudspeakers range from 1% to 5% efficiency but can be lower or higher as well. These efficiency levels relate the ratio of the electrical input to the acoustic output. As an example, 100 electrical watts of power are typically converted to 3 to 4 watts of acoustic power for a 3% to 4% efficient loudspeaker. The remaining electrical power is converted to heat.

Loudspeaker voice coils can be heated to temperatures of over 450° F. degrees (232° C.). These heat levels are extreme and can produce device failure due to degradation of the adhesive systems used to bond the voice coil to its carrier as well as the adhesives used to bond each turn to the next on the voice coil itself. In addition to device failure, the voice coil's direct current ("DC") resistance is also affected by heat. Every alloy of conductor has a Temperature Coefficient of Resistance. This coefficient relates the temperature of the conductor to the DC resistance of the conductor. As the temperature increases, the DC resistance of the conductor also increases. As the DC resistance increases, the current flow thru the conductor decreases and is described by Ohms law, $$V=I/R \quad (2)$$

where V is the applied voltage across the voice coil, I is the current flow thru the voice coil and R is the voice coil's DC resistance. As mentioned earlier, the force of interaction between the permanent magnet 104 and the electro-magnet (the voice coil 102) is proportional to the current flow thru the coil 102. If the DC resistance of the voice coil is raised due to heating, then the current draw reduces and, as a consequence, the Lorentz force is reduced.

The change in Lorentz force as a function of DC resistance change from heating is referred to as Power Compression (e.g., as seen in FIG. 1). As the electrical power applied to the voice coil increases, the temperature of the voice coil increases. This increase in voice coil temperature increases the DC resistance and will reduce the current flow thru the voice coil. As the Lorentz force decreases due to reduced current flow the overall loudspeaker conversion efficiency is reduced.

It is desirable to minimize the heat rise associated with current flowing through the voice coil. Technical reviews of the heat produced by voice coils and subsequent performance alterations can be found in various professional journals. "Heat Dissipation and Power Compression in Loudspeaker", Douglas Button, J. Audio Eng. Soc., Vol. 40, No. 1/2 1992, and "heat Transfer Mechanisms in Loudspeakers: Analysis, Measurement, and Design", Clifford a. Henricksen, J.Audio Eng. Soc., Vol. 35, No. 10, 1987 are typical examples of theoretical analysis and measurement of the thermal effects of loudspeaker voice coils.

More elaborate motor structures have been developed in the search for more linear performance over greater excursions such as E.M. Stiles U.S. Pat. No. 6,917,690, which describes a dual-gap geometry including a second 2nd magnet spaced between first and second annular plates (not shown) and this geometry creates an even greater obstruction for convective cooling air flow.

There is a need, therefore, for a loudspeaker motor structure adapted to withstand the thermal extremes encountered in modern high-power long-excursion loudspeaker systems.

SUMMARY OF THE INVENTION

There has been summarized above, rather broadly, the prior art that is related to the present invention in order that the context of the present invention may be better understood and appreciated. In this regard, it is instructive to also consider the objects and advantages of the present invention.

It is a primary object of the present invention to overcome the above mentioned difficulties by providing a transducer motor structure adapted to withstand high-excursion, high power loudspeaker applications.

Another object of the present invention is to provide a loudspeaker motor structure economically configured to conduct, convect and radiate heat energy away from the critical voice coil and magnetic gap areas.

Another object of the present invention is to provide a loudspeaker motor structure configured to withstand high thermal loads and overcome the prior art's voice-coil temperature induced dynamic distortion and compression mechanisms.

The aforesaid objects are achieved individually and in combination, and it is not intended that the present invention be construed as requiring two or more of the objects to be combined.

In accordance with the method and structure of the present invention, a new loudspeaker motor configuration includes a transducer motor structure with substantially radial air channels which define inner and outer airflow lumens or vent passages that allow greatly increased airflow which is aimed to impinge directly on the voice coil for maximum cooling effect. The natural pumping action of the transducer is used to drive this airflow. This increased airflow reduces the operating temperature of the voice coil, enhancing the transducer's acoustic output and its durability.

Applicant's work has shown that improving airflow allows more power to be applied to the loudspeaker. The improved transducer of the present invention with increased airflow allows for more power to be applied for the same voice coil temperature, increasing the acoustic output the transducer can generate. In accordance with the present invention, an improved Audio Transducer with Forced Ventilation includes a spacer member defining radial forced ventilation cooling channels or lumens in the ferrous or possibly non-ferrous annular member which is aligned and assembled between the front plate or washer and the basket on the outside.

As will be illustrated and described in greater detail below, the transducer motor structure for generating acoustic vibrations in response to an electrical audio signal, comprises a voice coil former having an open interior lumen with a surface adapted to carry a conductive voice coil and the voice coil former's interior lumen defines an interior pumping volume with a selected axial length. A magnetic circuit comprises at least a first magnet configured to generate a permanent magnetic field, a pole piece having a central axis, a magnetic field return path, and a first magnetic gap defining plate or washer, where the pole piece, return path and first magnetic gap defining plate are all configured to constrain lines of magnetic flux from the permanent magnetic field across a first magnetic gap and where the pole piece projects into the voice coil former's open interior lumen. The magnetic circuit preferably includes a ferrous or magnetically conductive vented annular spacer defining a plurality of (e.g., ten) radially aligned channels or lumens giving fluid communication between the voice coil and the former's interior lumen and the ambient environment surrounding the transducer motor. The magnetic gap defining plate or washer abuts the ferrous or magnetically conductive vented annular spacer and is configured to provide a first magnetic gap selected thickness that is less than the voice coil's selected length.

The transducer motor structure of the present invention is optionally configured with first and second "XBL style" voice coil gaps and the ferrous or magnetically conductive vented annular spacer is then defined as a two-piece assembly comprising an inside annular spacer member (e.g., 355A) and a co-planar outside annular spacer member (e.g., 350-O), each preferably having an equal number of (e.g., ten) axially aligned channels configured to aim cooling airflow at and around the voice coil.

The above and further objects features and advantages of the present invention will become apparent with consideration of the detailed description of specific embodiments thereof, particularly when taken in conjunction with the accompanying drawings, wherein like reference numbers in the various illustrative figures are used to designate like components.

DETAILED DESCRIPTION OF THE INVENTION

Turning now to FIG. 1 and FIGS. 3-9, a forced ventilation transducer motor structure is adapted to withstand high-excursion, high power loudspeaker applications and is configured to withstand high thermal loads and overcome the prior art's voice-coil temperature induced dynamic distortion and compression mechanisms.

In accordance with the method and structure of the present invention, a new loudspeaker motor structure includes a transducer motor with substantially radial air channels which define inner and outer airflow lumens or vent passages that allow greatly increased airflow which is aimed to impinge directly on the voicecoil for maximum cooling effect. The natural pumping action of the transducer is used to drive this airflow. This increased airflow reduces the operating temperature of the voicecoil, enhancing the transducer's acoustic output and its durability.

Figure 1:
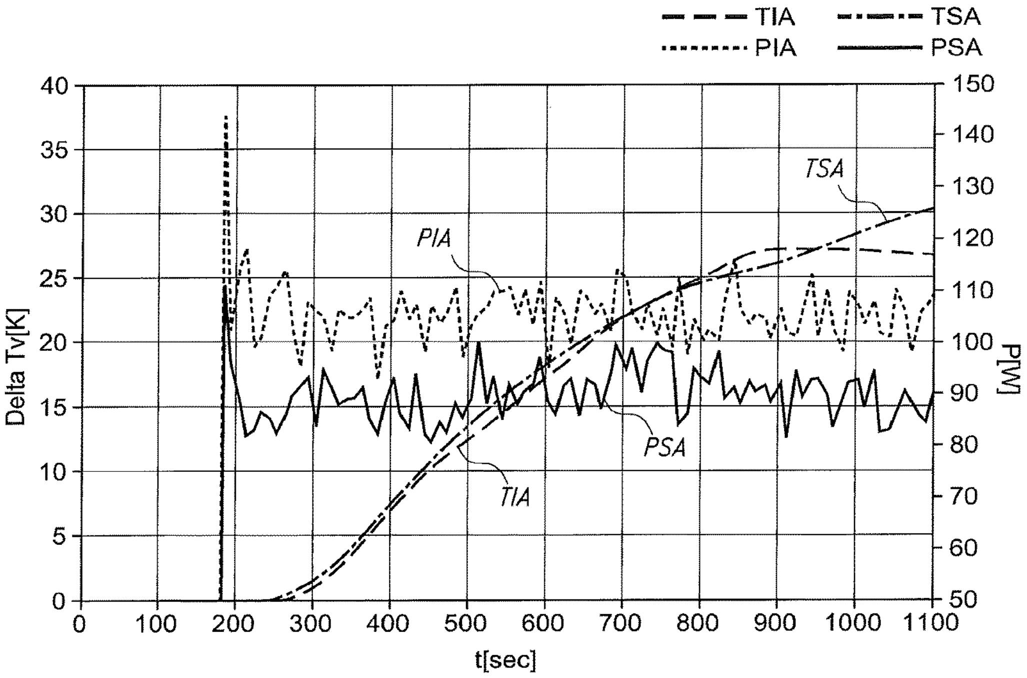
FIG. 1 is a diagram of plotted voice coil temperatures as a function of time illustrating increasing voice coil temperatures with increasing power levels over time, with and without increased airflow from forced cooling, in accordance with the present invention.

As can be seen in the "Increased Airflow" plots of FIG. 1, improving airflow allows more power to be applied to the loudspeaker. The Std Airflow curves show voice coil temperature (TSA-dashed) and applied power (PSA-solid) for a transducer with typical airflow. The Increased Airflow curves show temperature (TIA) and applied power (PIA) for an otherwise similar transducer modified to provide increased airflow (in accordance with the present invention). Note that the temperatures are essentially the same (until about 900 seconds), but the applied power levels are different. The improved transducer of the present invention with increased airflow allows for more power to be applied for the same voicecoil temperature, increasing the acoustic output the transducer can generate.

Figure 3:
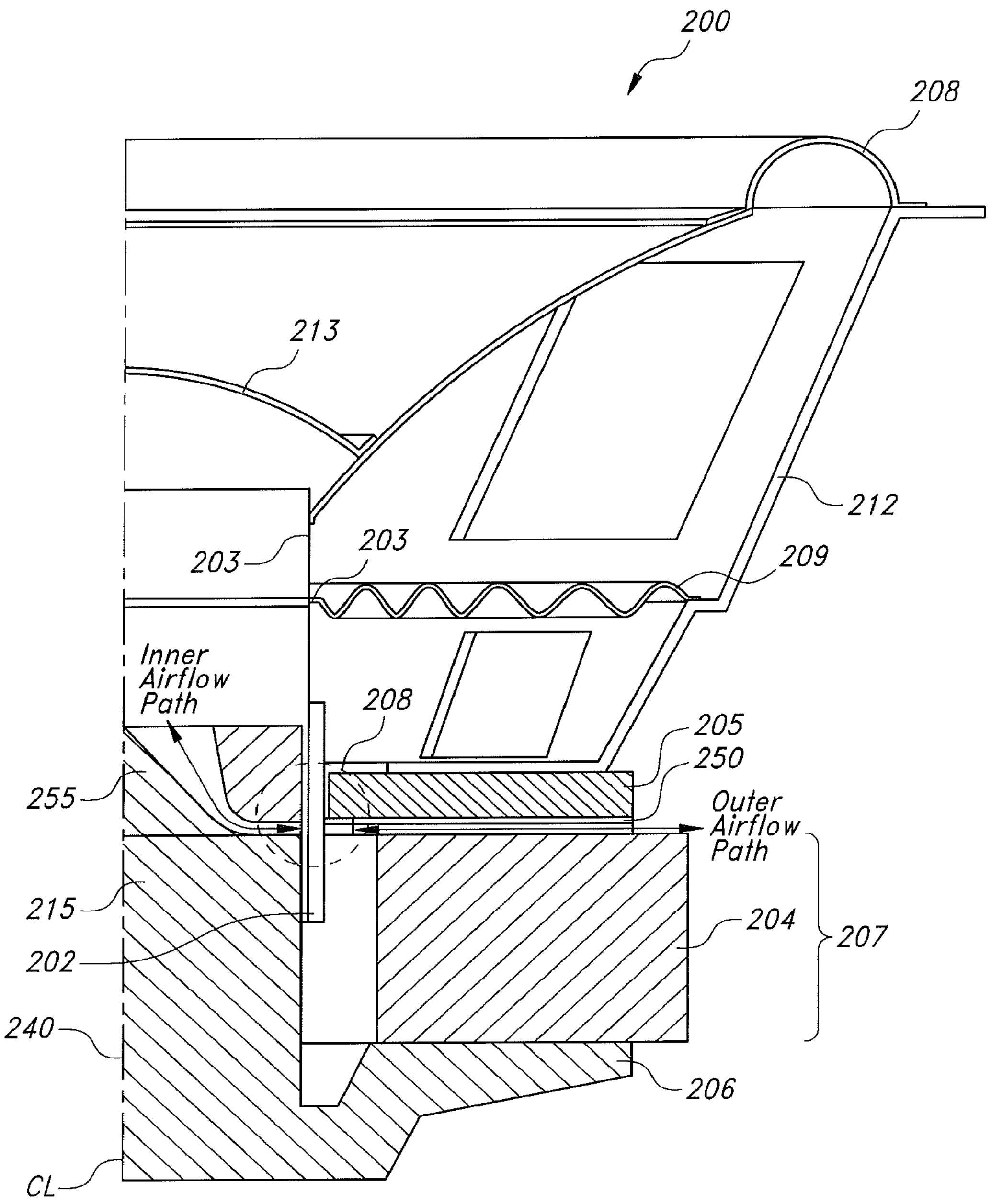
FIG. 3 is a cross section view in elevation of a forced ventilation transducer motor structure illustrating a configuration aiming cooling airflow transversely into single voice coil gap with a vented spacer between the washer and magnet, in accordance with the present invention.

In accordance with the present invention (e.g., as illustrated in the embodiment of FIG. 3), an improved Audio Transducer with Forced Ventilation 200 includes a spacer member 250 defining radial forced ventilation cooling channels or lumens in the possibly non-ferrous annular member which is aligned and assembled between the front plate or washer 205 and the basket 212 on the outside.

FIG. 3 illustrates an audio transducer or woofer 200 and a method to effectively and economically provide forced ventilation of the transducer motor's internal components, in accordance with the present invention. In audio transducer 200, convective cooling air is aimed to flow around and over the voicecoil 202 in a substantially unrestricted manner and is directed through and past the driver's gap region 208. During the woofer's excursions, cooling air is forced to flow through radially aligned lumens or passages in spacer 250 which are aligned with passages in ventilated distal pole tip member 255 and around the narrow regions between the voicecoil 202 and front plate or washer 205. These aligned, aimed passages are tapered to enhance flow velocity but do not constrict the airflow, and instead focus higher velocity cooling airflow into and around voice coil 202, during loudspeaker operation.

As noted above, high power signals driving a speaker's diaphragm or cone (e.g., 201) into extreme excursions can cause the (usually pistonic) motion of the diaphragm to become mis-aligned when driven by more challenging audio signals, but the motor structure of the present invention helps maintain voice coil alignment. Woofer 200 utilizes a circular basket supporting frustoconical driver diaphragm 201 having a circular peripheral edge carrying an annular surround or suspension 208. The cylindrical voice coil bobbin 203 carries conductive voice coil 202 wound around its outer circumferential wall and is affixed to the center of a frusto-conical diaphragm 201 or cone, and both are fixed to the inner peripheral edge of annular or ring-shaped surround or edge 208 and to an annular damper or "spider" 209 having a selected compliance and stiffness. The outer peripheral ends of the surround 208 and the spider 209 are fixed to a rigid supportive frame or basket 212 that also carries magnetic circuit 207, so that the frame 212 supports diaphragm 201 and voice coil bobbin 203, which are pistonically movable within the frame along the central axis of bobbin 203. Centered "dust" cap 213 is fixed on the diaphragm 201 to cover the hole at the center of the diaphragm and moves integrally with the diaphragm.

The edge 208 and damper 209 support the voice coil 202 and voice coil bobbin 203 at respective predetermined positions in magnetic gap 208 of the magnetic circuit 207, which (in the embodiment of FIG. 3) consists of a magnet 204, front plate or washer 205 which is axially aligned with and rests against a vented annular spacer 250, and a pole yoke 206 including a central, axially symmetrical pole piece 215 that supports with an axially aligned vented distal pole tip member 255. Vented annular spacer 250 is preferably configured as an annular disc-like member having a selected number (e.g. ten) radially aligned evenly spaced lumens or air flow channels defined therein where outer peripheral openings provide fluid communication to the ambient environment and inner peripheral openings, aimed at the voice coil 202 in the gap 208. Voice coil former or bobbin 203 has a sealing voice coil plug 203P which provides a substantially airtight seal at the distal or dustcap end, thus trapping air in the proximal volume enclosed within the interior of the bobbin.

The spacer's air flow channels are aligned axially with an equal number of aligned air flow channels defined in vented distal pole tip member 255. With this structure, diaphragm 201 is elastically supported without contacting the magnetic circuit 207 and can vibrate like a piston in the axial direction within a predetermined amplitude range for which cooling air is focused on or around voice coil 202 during excursions.

First and second ends or leads of the voice coil 202 are connected to the respective ends of first and second conductive lead wires (not shown) which are also connected to first and second terminals (not shown) carried on frame 212. When an alternating electric current corresponding to a desired acoustic signal is supplied at the terminals to voice coil 202 through the lead wires, the voice coil 202 responds to a corresponding electro-motive force and so is driven axially in the magnetic gap of the magnetic circuit 207 along the piston vibration direction of the diaphragm 201. As a result, the diaphragm 201 vibrates together with the voice coil 202 and voice coil bobbin 203, and converts the electric signals to acoustic energy, thereby producing acoustic waves such as music or other sounds.

As noted above, the magnetic field or "B" field acting on the voice coil 202 is generated in the annular magnet 204, and the lines of flux pass from magnet 204, through the vented spacer 250 and then through front plate or washer 205, across the annular magnetic gap to the vented distal pole tip member 255 and the peripheral upper edge of pole piece 215, down through pole piece 215, radially out through yoke 206 and then back into magnet 204, forming a closed loop of magnetic flux. The field strength in the magnetic gap is very high, and so the radial distance across the magnetic gap is selected to minimize loss of field strength while enhancing operation and reliability.

The motor in woofer 200 preferably utilizes a permanent magnetic material, such as neodymium iron boron, aluminum nickel cobalt, or other rare earth or ceramic materials, that is placed in magnetic circuit 207 with front plate or washer 205 consisting of a plate of low carbon steel on the north magnetic pole of the permanent magnet 204 and another plate-like surface of low carbon steel (e.g., incorporated in yoke 206) on the south magnetic pole of the permanent magnet. Either the plate on the north magnetic pole or the plate on the south magnetic pole is shaped to provide a small magnetic gap. The magnetic gap is usually annular but need not necessarily be of an annular geometry to be functional. In addition to the annular space defining the magnetic gap 208, the spaces between the annular inner surfaces of magnet 204 and within yoke 206 define a partially enclosed annular volume into which the voice coil former or bobbin can move during an inward excursion. The low carbon steel plates act to concentrate the magnetic field in that volume of space known as the magnetic gap and provide a path for conductive cooling of the voice coil region 208.

The electromagnet portion of the transducer is provided by voice coil 202 which consists of a coiled length of electrical conductor (e.g., copper, aluminum or silver wire of a selected gauge) suspended in magnetic gap 208.

The force of interaction between the permanent magnetic field and the electro-magnetic, or coil, will produce an axial acceleration and direction of the voice coil displacement will be pistonic (either up or down) along the central axis 240. The ability of loudspeaker 200 to convert electrical signals to proportional mechanical displacements and subsequently to acoustical energy or the conversion efficiency is proportional to Lorentz force as well as the total moving mass of the loudspeaker 200, including voice coil 202, cone 201, dust cap 213, and all parts of the transducer that move relative to the permanent magnet structure and frame 212. The efficiency transducer 200 (i.e., the ratio of the electrical input to the acoustic output) is typically greater than for a prior art transducer, since less of the input power is lost to heat, and, as illustrated in the plots labelled "increased airflow") temperatures are usually lower and power converted to acoustical energy is higher, and less compressed at the highest drive levels.

Typical loudspeaker voice coils can be heated to extreme temperatures of over 450° F. degrees (232° C.). In woofer 200, during operation, the cooling air has been observed to keep voice coil temperatures in an acceptable operating range for very large drive signals over extended test intervals, demonstrably reducing the instances of failure due to degradation of the adhesive systems used to bond the voice coil to its carrier as well as the adhesives used to bond each turn to the next on the voice coil itself. In addition the voice coil's direct current ("DC") resistance is also less affected by heat. As mentioned earlier, the force of interaction between the permanent magnet 204 and the electro-magnet (the voice coil 202) is proportional to the current flow thru the coil 202, and when the DC resistance of the voice coil is raised due to heating, the current draw reduces and, as a consequence, the Lorentz force is reduced.

The change in Lorentz force as a function of DC resistance change from heating (or Power Compression, e.g., as seen in FIG. 1) is improved for woofer 200. As the electrical power applied to the voice coil increases, the temperature of the voice coil increases less than in prior art woofers so power compression is reduced and the overall loudspeaker conversion efficiency is enhanced.

In operation, the reciprocating excursions of woofer cone 201 create forced air flow which is aimed by the radial forced ventilation channels defined or incorporated into vented distal pole tip member 255, or into a secondary part or parts that sits on top of the pole 215 and aligned with the radial forced ventilation channels in the annular spacer member 250. These channels redirect airflow from a generally downward path (as seen in FIG. 3 to a radial path against the voicecoil, while providing a lower resistance path that allows for increased overall airflow.

Figure 4:
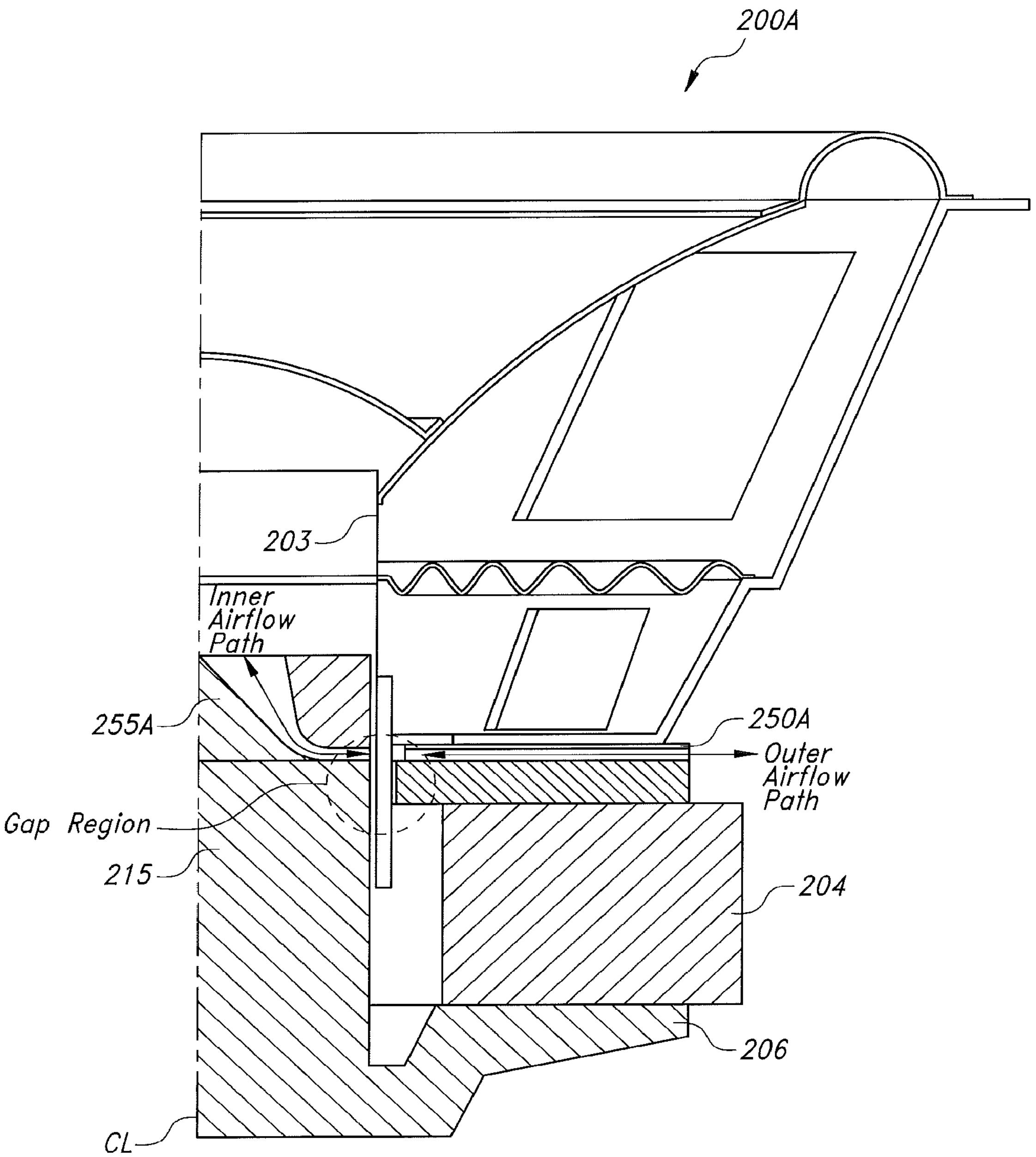
FIG. 4 is a cross section view in elevation of another forced ventilation transducer motor structure illustrating a configuration aiming cooling airflow transversely into single voice coil gap with a vented spacer between the washer and basket, in accordance with the present invention.

In another embodiment 200A illustrated in FIG. 4, the channels are part of a ferrous spacer 250A that interposes between the washer and the magnet on the outside. Another set of channels is incorporated into the tip of the pole, or into a secondary part or parts (e.g., vented distal pole tip member 255A) that sits on top of the pole. These channels also redirect airflow from a generally downward path to a radial path against the voicecoil.

Figure 2:
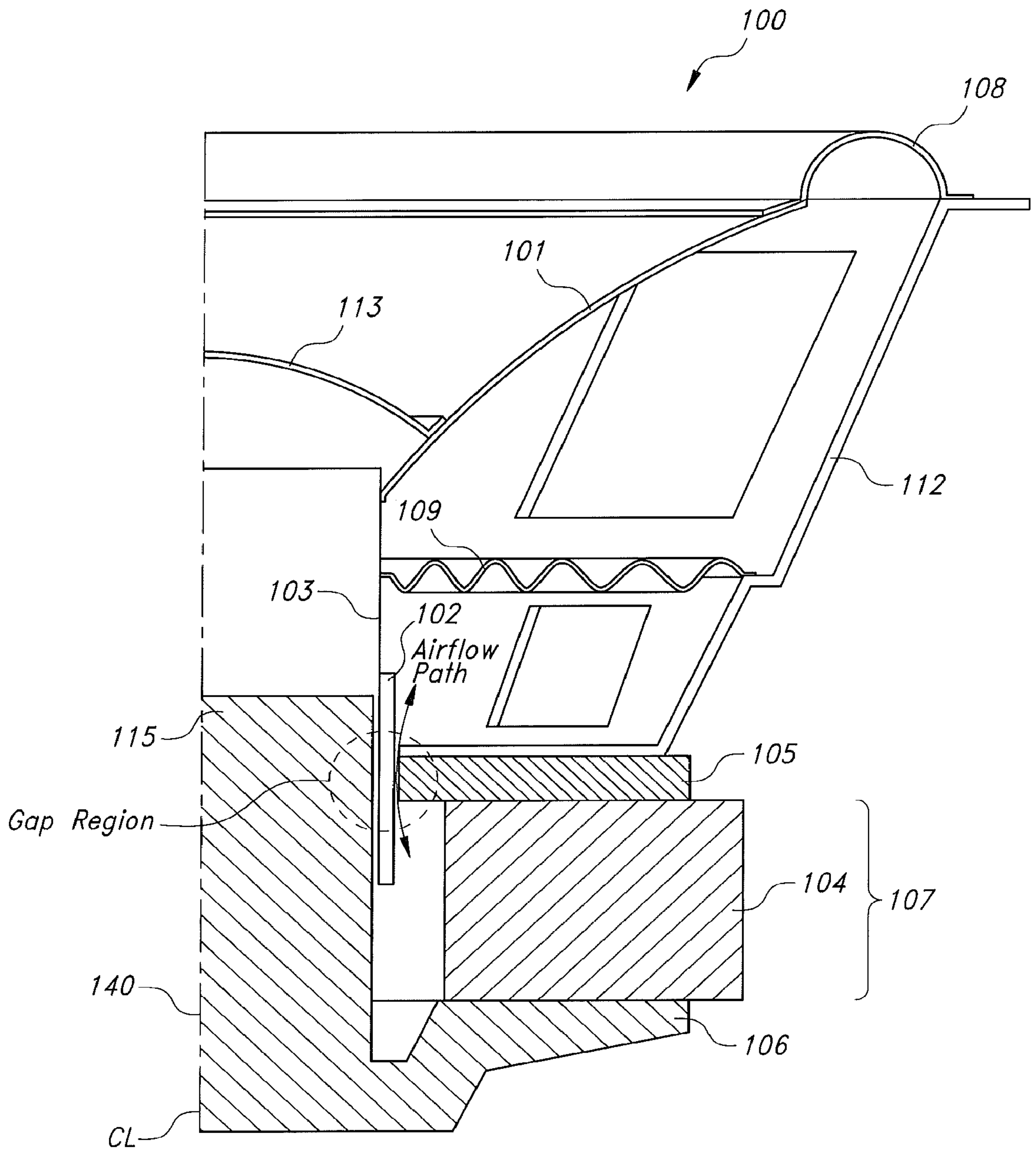
FIG. 2 is a cross section view in elevation of a conventional transducer motor structure, in accordance with the prior art.

In yet another embodiment 300, the key characteristics of an XBL-type motor are used (See FIG. 5) which consists of two ferrous (usually steel) disks with central holes that reside outside the voicecoil. In some applications there is also a set of disks inside the voicecoil. These disks form the two magnetic gaps necessary for an XBL design. The inner disks can be replaced by a pole (e.g., as illustrated in FIGS. 2, 3 & 4) to provide an alternative configuration with reduced electromagnetic performance but which is still a dual-gap design.

Figure 5:
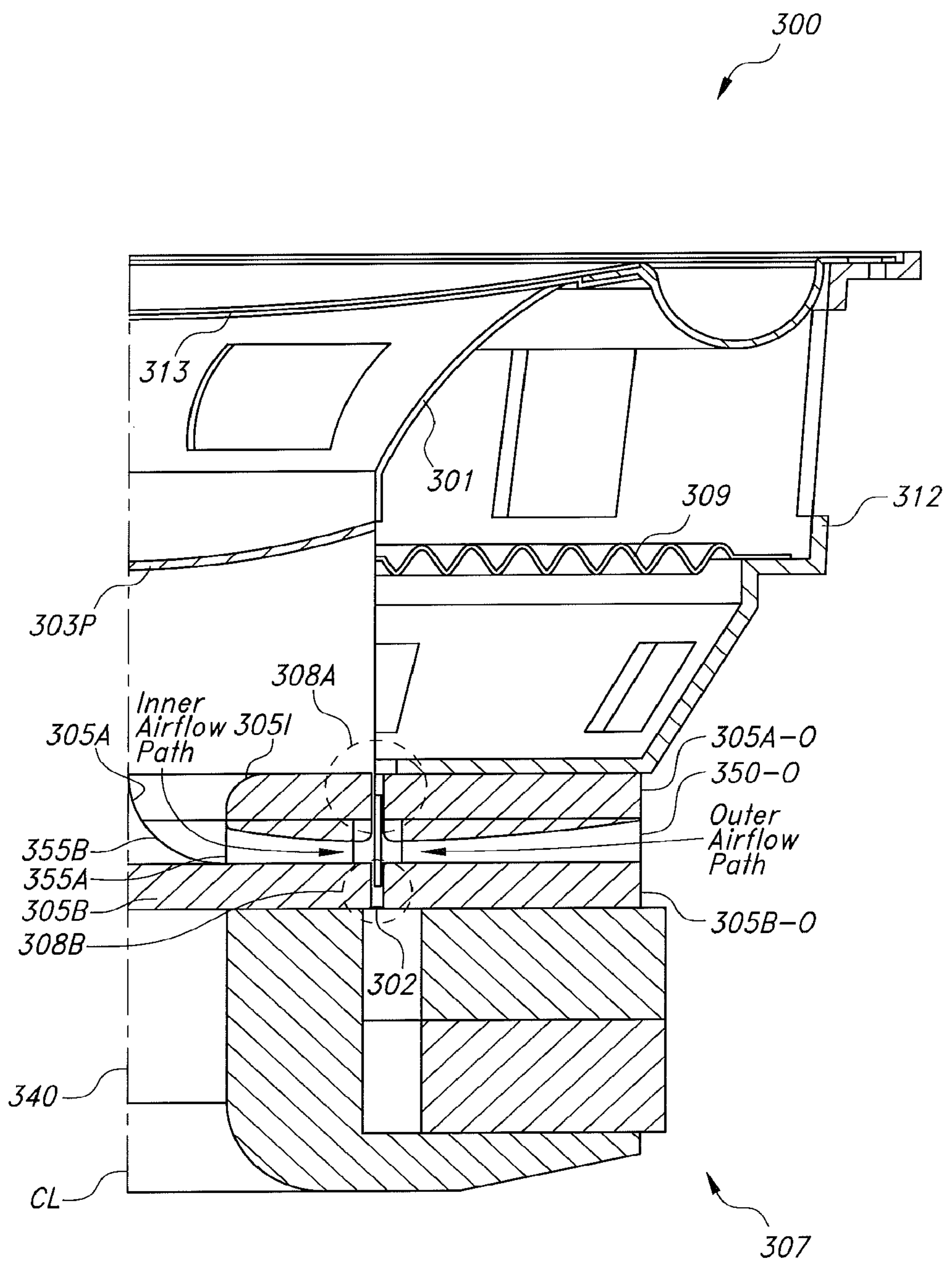
FIG. 5 is a cross section view in elevation of another forced ventilation transducer motor structure illustrating a configuration aiming cooling airflow transversely into first and second voice coil gaps with inside and outside vented spacers between the magnetic gap defining discs, in accordance with the present invention.

Returning to the woofer 300 illustrated in FIG. 5, in between these magnetic gap-forming disks (e.g., 305A-I and 305A-O for the upper or distal gap 308A and 305B-I and 305B-O for the lower or proximal gap 308B) is a pair of co-planar spacer disks (e.g., Inside vented spacer 355A and Outside vented spacer 350-O), with one laterally outside and another closer to central axis 340 (and hence inside) if the inside disks are present, also of ferrous material to allow magnetic flux to pass through. These gap-forming disks (e.g., 305A-I and 305A-O for the upper or distal gap 308A and 305B-I and 305B-O for the lower or proximal gap 308B) do not need to be solid material to pass the required magnetic flux.

Figure 8:
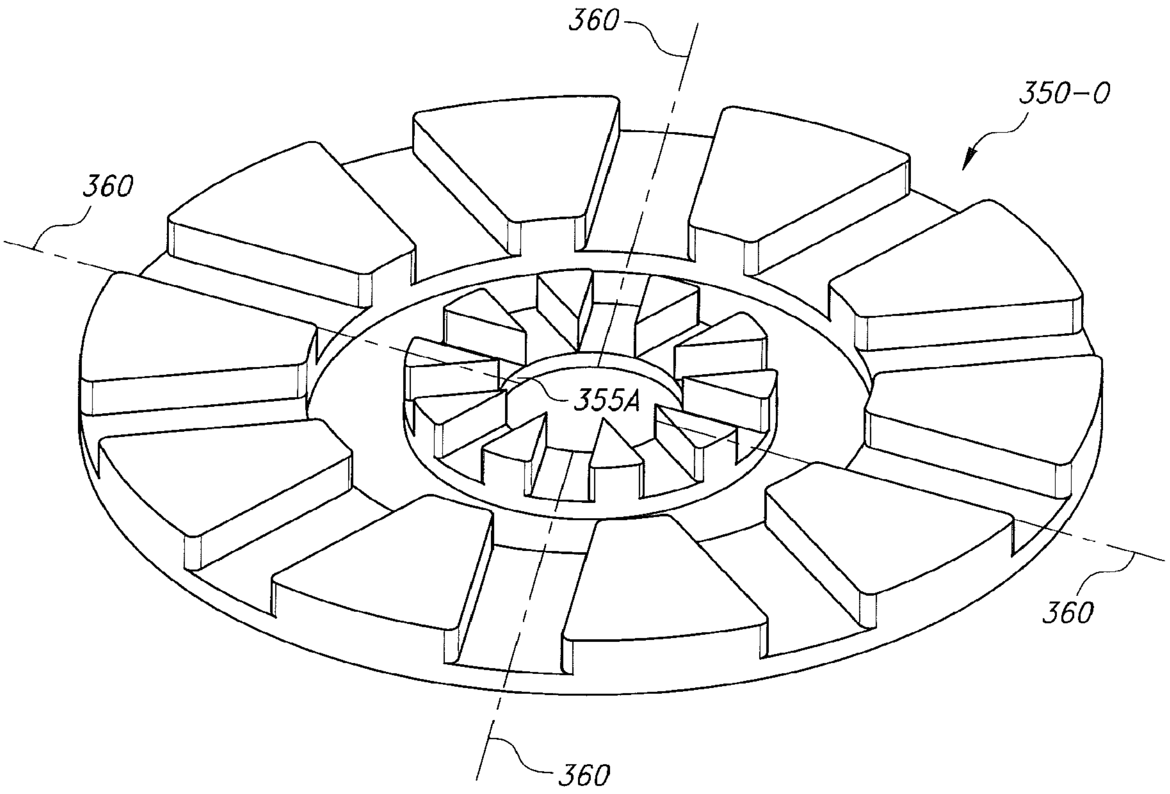
FIG. 8 is a perspective view of the co-planar inside and outside vented spacers in the forced ventilation transducer motor structure of FIGS. 5, 6 and 7, illustrating the airflow aiming paths or lumens, in accordance with the present invention.
Figure 9:
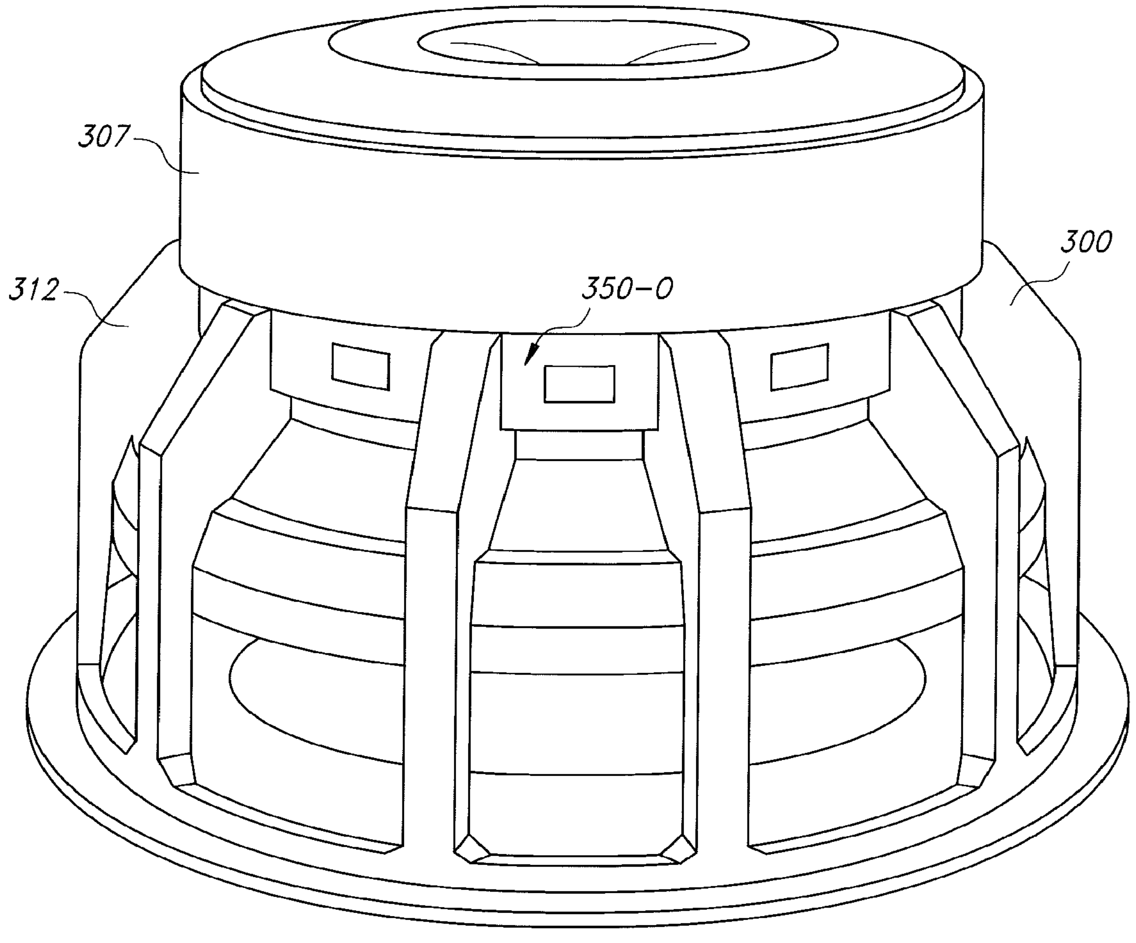
FIG. 9 is a perspective view of the audio speaker or loudspeaker driver with the forced ventilation transducer motor structure of FIGS. 5, 6 and 7, illustrating the peripheral openings of the airflow aiming paths or lumens, in accordance with the present invention.

The spacer(s), either the outside, inside or both (e.g., 350-O and 355A), and preferably have aligned radial airflow paths, lumens or channels cut into them (See, e.g. FIGS. 5 and 8). These radial airflow paths, lumens or channels do not have to go all the way through the spacer(s) (i.e., in terms of thickness), which provides one-piece unitary or contiguous annular members which facilitate assembly by allowing stacking and alignment of the spacer(s) (e.g., 355A and 350-O) as one piece, each having a crenelated upper surface which defines a plurality of (e.g., ten) equally spaced radially aligned grooves or notches to define the radial airflow paths, lumens or channels. These radial channels each form a transverse path that allows air to flow through the motor structure, focusing the airflow directly onto the voicecoil 302.

For Dual Gap woofer 300 (as illustrated in FIGS. 5-9) a structure and method to effectively and economically provide forced ventilation of the transducer motor's internal components is provided, in accordance with the present invention. Convective cooling air is aimed to flow around and over the voicecoil 302 in a substantially unrestricted manner and is directed through and past the driver's gap regions 308A, 308B. Woofer 300 shares some electrical and magnetic features with the dual gap woofer shown in Stile's U.S. Pat. No. 6,917,690 but provides much improved mechanical and thermal performance. During excursions for woofer 300, cooling air is forced to flow through radially aligned lumens or passages in outside spacer 350-O which are aligned with passages in ventilated inside spacer 355A which is mounted within the voice coil former's interior lumen. These aligned, aimed passages are preferably tapered to enhance flow velocity but do not constrict the airflow, and instead focus higher velocity cooling airflow into and around voice coil 302, during loudspeaker operation.

As noted above, high power signals driving a speaker's diaphragm or cone (e.g., 301) into extreme excursions can cause the (usually pistonic) motion of the diaphragm to become mis-aligned when driven by more challenging audio signals, but the motor structure of the present invention helps maintain voice coil alignment. Woofer 300 utilizes a circular basket supporting frustoconical driver diaphragm 301 having a circular peripheral edge carrying an annular surround or suspension 308. The cylindrical voice coil former or bobbin 303 carries conductive voice coil 302 wound around its outer circumferential wall and is affixed to the center of a frusto-conical diaphragm 301 or cone, and both are fixed to the inner peripheral edge of annular or ring-shaped surround or edge and to an annular damper or "spider" 309 having a selected compliance and stiffness. The outer peripheral ends of the surround and the spider 309 are fixed to a rigid supportive frame or basket 312 that also carries magnetic circuit 307, so that the frame 312 supports diaphragm 301 and voice coil bobbin 303, which are pistonically movable within the frame along the central axis 340. Centered "dust" cap 313 is fixed on the diaphragm 301 to cover the hole at the center of the diaphragm and moves integrally with the diaphragm.

The edge and damper 309 support the voice coil 302 and voice coil bobbin 303 at respective predetermined positions in the magnetic gaps 308A, 308B of the magnetic circuit, which (in the embodiment of FIG. 5) consists of a magnet, outside front plates or disks 305A-O, 305B-O which is axially aligned with and rest against a vented outside annular spacer 350-O, and a corresponding inside disks (305A-I, 305B-I). Vented annular Outside spacer 350-O is preferably configured as an annular disc-like member having a selected number (e.g. ten) radially aligned evenly spaced and transversely aligned lumens or air flow channels defined therein where outer peripheral openings provide fluid communication to the ambient environment and inner peripheral openings, aimed at the voice coil 302 in the gap. The outside spacer channels are aimed at and aligned with an equal number (e.g., 10) transverse radial channels defined in inside spacer 355A to define aligned airflow paths therebetween.

Voice coil former or bobbin 303 optionally includes a sealing voice coil plug 303P which provides a substantially airtight seal at the distal or dustcap end, thus trapping air in the proximal volume enclosed within the interior of the bobbin. The Inside and Outside spacers' air flow channels are aligned axially with an equal number of aligned air flow channels as shown in FIG. 8. With this structure, diaphragm 301 is elastically supported without contacting the magnetic circuit 307 and can vibrate like a piston in the axial direction within a predetermined amplitude range for which cooling air is focused on or around voice coil 302 during excursions.

Figure 6:
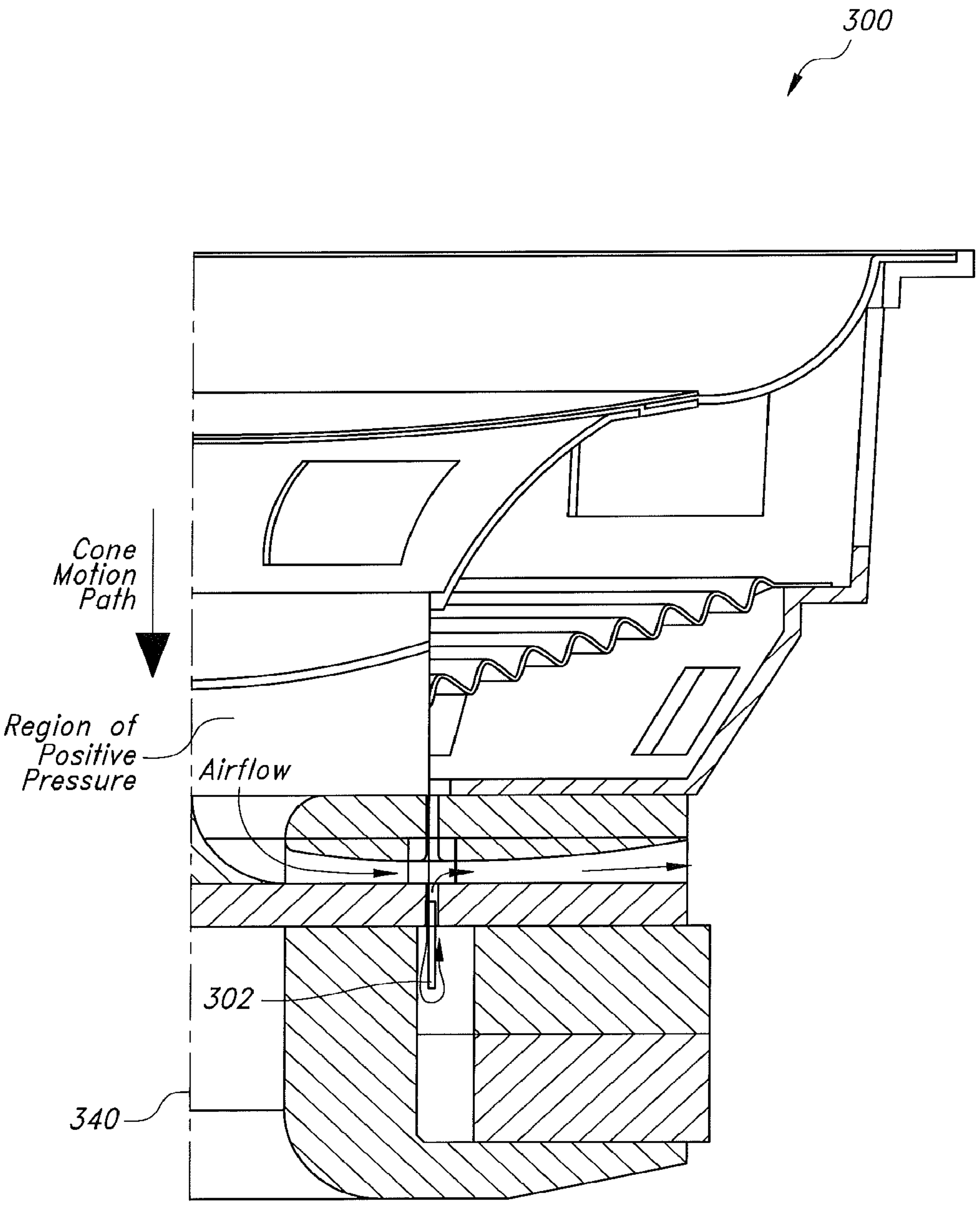
FIG. 6 is a cross section view in elevation of the forced ventilation transducer motor structure of FIG. 5, illustrating the airflow effect of proximal, inward or downward excursion or motion, forcing positive pressure and aiming cooling airflow outwardly and transversely into and then from first and second voice coil gaps via the lumens defined in the inside and outside vented spacers between the magnetic gap defining discs, in accordance with the present invention.
Figure 7:
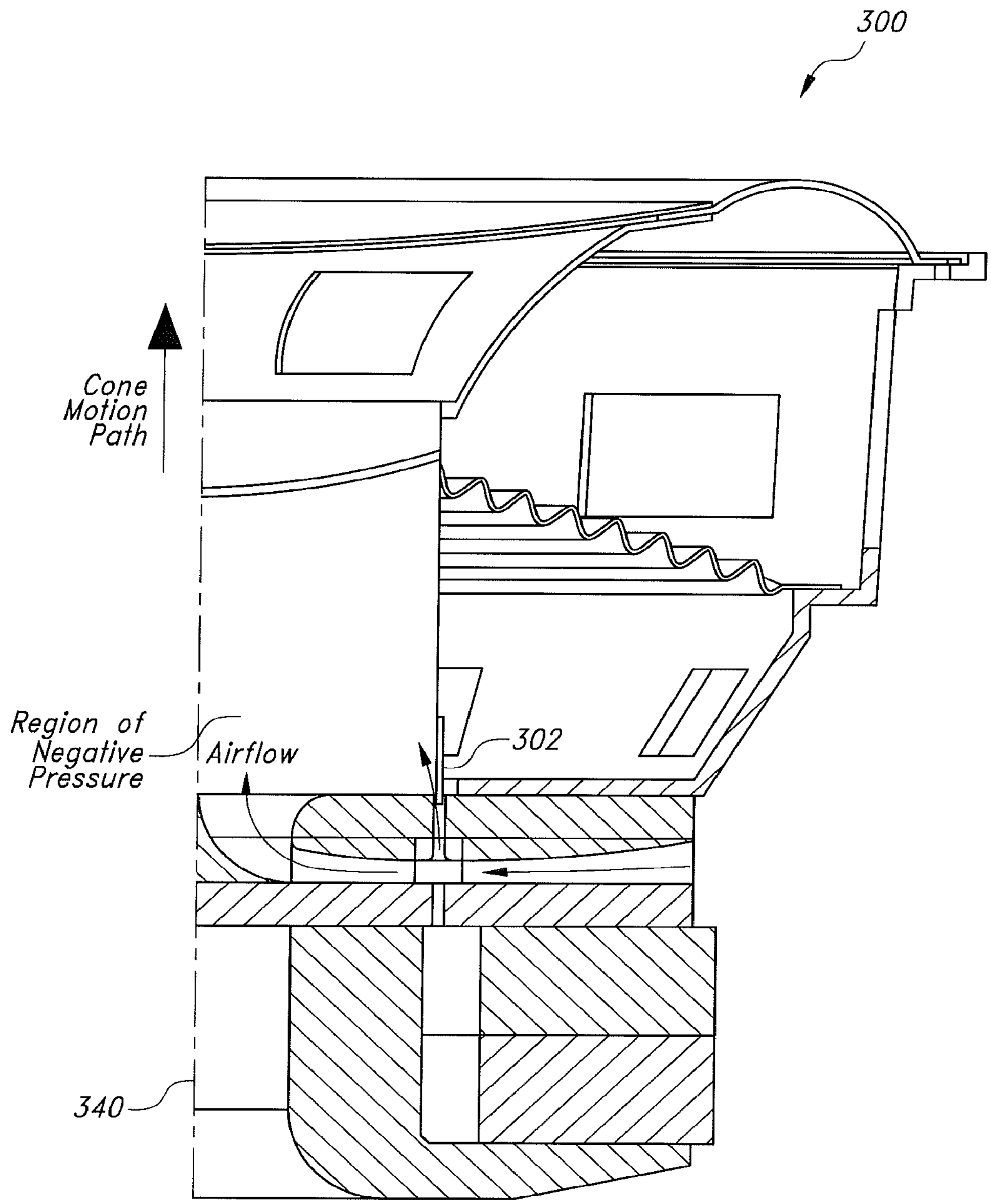
FIG. 7 is a cross section view in elevation of the forced ventilation transducer motor structure of FIGS. 5 and 6, illustrating the airflow effect of distal, outward or upward excursion or motion, forcing negative pressure and aiming cooling airflow inwardly from first and second voice coil gaps via the lumens defined in the inside and outside vented spacers between the magnetic gap defining discs, in accordance with the present invention.

In all embodiments, the airflow is driven by the natural pumping action of the key moving parts: cone 301, voicecoil 302, and dustcap 313 or voicecoil plug 303P. During woofer operation, the reciprocating motion provides a pumping action is a normal consequence of the production of sound, as illustrated in FIGS. 6 and 7. In FIG. 6, the moving parts are moving downward, inward or proximally along central axis 340. This causes air pressure in the voicecoil regions 308A and 308B to increase, which in turn causes cooling air to flow from within the volume of trapped air at the pole tip and outwardly or radially around and over voice coil 302. In FIG. 7 the moving parts are moving upward, outward or distally causing lower air pressure in the volume at the pole tip voicecoil, then which reverses the airflow, and draws in cool ambient air from the side-openings, where that cool ambient air is also aimed to flow over and past the voice coil 302. This air pumping process is essentially the same in the single-gap designs of FIGS. 3 and 4.

The channels can be shaped in such a way as to smooth the airflow and minimize turbulence. Similar shaping can be applied to the upper inside disk or top of pole to smooth the airflow on the inside of the voicecoil. For example, an optional distally projecting tapered plug (e.g., 355B, as shown in FIG. 5) can be placed on or defined upon the distal surface of the pole piece or yoke supported central section within the voice coil bobbin's interior volume to turn pressure waves of air from flowing in axially (i.e., in parallel to central axis 340) and direct airflow smoothly, aiming it laterally through the inner spacer 355A.

The air volume contained inside the voicecoil bobbin is preferably sealed near the distal or top end so that the air contained therein is forced through the channels. If the typical dustcap is not of an airtight nature, possibly due to other performance concerns, or the total enclosed air volume is too great, the optional voicecoil plug (e.g., 203P or 303P) can be used inside the voicecoil bobbin or former.

If airflow velocity is too high through the channels and turbulence is created as a result, flow resistance and/or flow straightening may be incorporated placed in the channels to slow and smooth the airflow and reduce turbulence.

If a vented pole (one with a hole through the center) is used, say to save weight or material, then an air flow restrictor may be inserted to block air flowing through the center of the pole, which will would provide an alternate path for air to flow that is not against the voicecoil. If noise generated by airflow turbulence proves to be a problem, this block could be replaced with an attenuating plug that restricts but does not eliminate air flow to reduce the velocity of flow through the spacer channels. A similar feature may be used on the vents in the basket under the spider.

Persons of skill in the art will appreciate that the present invention makes available a transducer motor structure for generating acoustic vibrations in response to an electrical audio signal, and includes: a voice coil former (e.g., 203) having an open interior lumen with a surface adapted to carry a conductive voice coil (e.g., 202) having first and second electrical connections; said voice coil former being configured to drive a diaphragm (e.g., 201); wherein said single voice coil former's interior lumen defines an interior pumping volume with a selected axial length; a magnetic circuit (e.g., 207) comprising at least a first magnet (e.g., 204) configured to generate a permanent magnetic field, a pole piece (e.g., 215) having a central axis (e.g., 240), a magnetic field return path, and a first magnetic gap defining plate or washer (e.g., 205), wherein said pole piece, said return path and said first magnetic gap defining plate are all configured to constrain lines of magnetic flux from said permanent magnetic field across a first magnetic gap (e.g., 208 or 308A); wherein said first magnetic gap is annular and dimensioned to receive said voice coil former in coaxial alignment, such that said voice coil is immersed in the magnetic field in said first magnetic gap; wherein said pole piece (e.g., 215) projects into said voice coil former's open interior lumen and is coaxially aligned with said voice coil former, such that said voice coil is constrained to move axially over said pole piece in response to an audio signal; wherein said magnetic circuit (e.g., 207) includes a ferrous or magnetically conductive vented annular spacer (e.g., 250) defining a plurality of (e.g., ten) radially aligned channels or lumens which provide fluid communication between said voice coil and said former's interior lumen and the ambient environment surrounding the transducer motor; wherein said pole piece has an axial length projecting into said former's lumen that corresponds to voice coil's selected length; and wherein said first magnetic gap defining plate or washer (e.g., 205) abuts said ferrous or magnetically conductive vented annular spacer (e.g., 250) and is configured to provide a first magnetic gap selected thickness, said first magnetic gap selected thickness being less than said voice coil's selected length.

The transducer motor structure of the present invention optionally (e.g., as illustrated in FIG. 5) is configured with first and second voice coil gaps (e.g., 308A, 308B) to provide an "XBL" style motor operating as described in U.S. Pat. No. 6,917,690, and the ferrous or magnetically conductive vented annular spacer is actually a two-piece assembly comprising an inside annular spacer member (e.g., 355A) and a co-planar outside annular spacer member (e.g., 350-O), each preferably having an equal number of (e.g., ten) axially aligned channels or airflow paths configured to aim cooling airflow along airflow axes 360 (see FIG. 8) at and around the voice coil (e.g., 302). The transducer motor structure's ferrous or magnetically conductive vented annular spacer inside annular spacer member (e.g., 355A) is a contiguous one-piece member having a substantially planar bottom surface opposite a crenelated upper surface defining said plurality of (e.g., ten) radially aligned equally spaced channels or lumens, wherein each radially aligned channel or lumen is preferably defined along a radial flow cooling axis (e.g. 360, as best seen in FIG. 8), and aimed at the voice coil when said transducer motor structure is assembled.

The transducer motor structure's ferrous or magnetically conductive vented annular spacer co-planar outside annular spacer member (e.g., 350-O) is also preferably cast, machined or forged as a contiguous one-piece member having a substantially planar bottom surface opposite a crenelated upper surface defining a plurality of radially aligned equally spaced channels or lumens, and that crenelated upper surface preferably defines an equal plurality of (e.g., ten) radially aligned equally spaced channels or lumens as the inside annular member, where, preferably each radially aligned channel or lumen is defined along one of inside annular spacer member's radial flow cooling axes 360 and aimed at the voice coil when said transducer motor structure is assembled. Preferably, the ferrous or magnetically conductive vented annular spacer inside annular spacer member (e.g., 355A) and co-planar outside annular spacer member (e.g., 350-O), are each made of a thermally conductive steel alloy.

In the embodiment of FIGS. 3 and 4, the motor structure is configured with a vented distal pole tip member (e.g., 255) carried on or defined the pole piece (e.g., 215) and defines a plurality of inner air flow paths, channels or lumens which provide fluid communication between the first magnetic gap (e.g., 208) and the voice coil former's open interior lumen. The motor structure's vented distal pole tip member's inner air flow paths, channels or lumens which are curved and define lateral openings aimed to direct cooling air transversely toward said first magnetic gap (e.g., 208 or 308A) and also define axial or forward facing openings aimed axially or distally into said voice coil former's open interior lumen. The transducer motor structure's ferrous or magnetically conductive vented annular spacer (e.g., 250, as seen in FIG. 3) defines a plurality of outer airflow paths or lumens having lateral openings aimed to direct cooling air laterally or transversely toward said first magnetic gap (e.g., 208 or 308A).

The present invention also makes available an audio speaker (e.g., 300, as seen in FIG. 5, to provide an "XBL" style motor operating as described in U.S. Pat. No. 6,917,690) comprising: a frame or basket (e.g., 312); a diaphragm assembly coupled to the frame and including a voice coil (e.g., 302); a motor structure coupled to the frame and including a magnetically conductive yoke, a first permanent magnet magnetically coupled to the yoke and polarized in a first orientation with respect to the yoke, a first plate magnetically coupled to the first permanent magnet and defining a first magnetic air gap (e.g., 308A) with the yoke, a second permanent magnet magnetically coupled to the first plate opposite the first permanent magnet and polarized in the first orientation with respect to the yoke, and a second plate magnetically coupled to the second magnet opposite the first plate and defining a second magnetic air gap (e.g., 308B) with the yoke, wherein magnetic flux travels in a same direction over the first and second magnetic air gaps, and wherein the voice coil (e.g., 302) is disposed within at least one of the magnetic air gaps (e.g., 308A or 308B); and wherein said motor structure further comprises a ferrous or magnetically conductive vented annular spacer inside annular spacer member (e.g., 355A) configured as a contiguous one-piece member having a substantially planar bottom surface opposite a crenelated upper surface defining said plurality of (e.g., ten) radially aligned equally spaced channels or lumens, wherein each radially aligned channel or lumen is defined along a radial flow cooling axis (e.g. 360), and aimed at said voice coil (e.g., 302) when said transducer motor structure is assembled.

The audio speaker transducer motor structure's ferrous or magnetically conductive vented annular spacer inside annular spacer member (e.g., 355A) is again preferably a contiguous one-piece member having a substantially planar bottom surface opposite a crenelated upper surface defining said plurality of (e.g., ten) radially aligned equally spaced channels or lumens, wherein each radially aligned channel or lumen is defined along a radial flow cooling axis and aimed at said voice coil when said transducer motor structure is assembled.

In accordance with the method of the present invention, the operating temperature of a voice coil (e.g., 202, 302) in a loudspeaker (e.g., 200 or 300) is maintained by:

(a) providing a voice coil former (e.g., 203) having an open interior lumen, said former being adapted to carry a single conductive voice coil (e.g., 202) having first and second electrical connections; said voice coil former being configured to drive a diaphragm (e.g., 201);

(b) providing a magnetic circuit (e.g., 207) comprising a magnet (e.g., 204) configured to generate a permanent magnetic field, a pole piece (e.g., 215) having a central axis (e.g., 240), a magnetic field return path; and a magnetic gap defining ferrous or magnetically conductive washer or plate (e.g., 205), wherein said pole piece, said return path and said magnetic gap defining plate are all configured to constrain lines of magnetic flux from said permanent magnetic field across a first magnetic gap (e.g., 208 or 308A); wherein said first magnetic gap (e.g., 208 or 308A) is annular and dimensioned to receive said voice coil former in coaxial alignment, such that said voice coil is immersed in the magnetic field in said magnetic gap; wherein said pole piece projects into said former's lumen and is coaxially aligned with said voice coil former, such that said voice coil is constrained to move axially over said pole piece in response to an audio signal; wherein said pole piece has an axial length projecting into said former's lumen that is co-extensive with said voice coil's selected length;

(c) assembling the magnetic gap defining plate(s) in abutment with the vented annular spacer (e.g., 250);

(d) aligning that vented annular spacer (e.g., 250) to aim cooling air at (at least) the first magnetic gap (e.g., 208 or 308A); and then (e) driving the voice coil with an electric signal to cause reciprocating motion in said former to pump air into and out of said former's lumen, focusing cooling air onto and around said voice coil during loudspeaker operation.

Having described preferred embodiments of a new and improved transducer motor structure and method, it is believed that other modifications, variations and changes will be suggested to those skilled in the art in view of the teachings set forth herein. It is therefore to be understood that all such modifications, variations and changes are believed to fall within the scope of the present invention as set forth in the following claims.

What is claimed is:

1. An audio speaker, comprising:

a frame;

a diaphragm operatively coupled to the frame;

a voice coil bobbin operatively coupled to the diaphragm, the voice coil bobbin having an interior lumen;

a magnetic circuit comprising a magnet, a front plate, a pole piece having a vented distal pole tip defining a plurality of first lumens, and a pole yoke positioned on an opposite side of the magnet relative to the front plate, the pole piece and the front plate being separate from one another by a gap region;

a voice coil positioned about and carried by the voice coil bobbin and extending within the gap region between the pole piece and the front plate, the voice coil being configured to convert an electric current into an electromotive force for imparting vibrational movement to the voice coil bobbin and the diaphragm; and a spacer positioned adjacent to the front plate, the spacer defining a plurality of second lumens aligned with the plurality of first lumens, the second lumens providing airflow paths from an ambient environment outside the audio speaker and configured to impinge air directly on the voice coil.

2. The audio speaker of claim 1, wherein the spacer is interposed between the magnet and the front plate, and wherein the spacer is magnetically conductive.

3. The audio speaker of claim 1, wherein the spacer and the magnet are positioned on opposite sides of the front plate.

4. The audio speaker of claim 1, wherein the pluralities of first and second lumens are equal in quantity to one another.

5. The audio speaker of claim 1, wherein the second lumens are radially arranged, and wherein the first lumens include radially extending portions that are aligned with the second lumens.

6. The audio speaker of claim 1, wherein the spacer comprises an annular inner spacer member and an annular outer spacer member positioned radially outside of the annular inner spacer member.

7. The audio speaker of claim 1, wherein the first and second lumens comprise first and second channels, respectively.

8. An audio speaker, comprising:

a frame;

a diaphragm operatively coupled to the frame;

a voice coil bobbin operatively coupled to the diaphragm, the voice coil bobbin having an interior lumen;

a magnetic circuit comprising a magnet, a first inner magnetic disk, a first outer magnetic disk positioned radially outside of the first inner magnetic disk, a pole piece, and a pole yoke positioned on an opposite side of the magnet relative to the first outer magnetic disk, the first inner magnetic disk and the first outer magnetic disk being separate from one another by a first gap region;

a voice coil positioned about and carried by the voice coil bobbin and extending within the first gap region between the first inner magnetic disk and the first outer magnetic disk, the voice coil being configured to convert an electric current into an electro-motive force for imparting vibrational movement to the voice coil bobbin and the diaphragm; and a spacer comprising an inner spacer member adjacent to the first inner magnetic disk and an outer spacer member adjacent to the first outer magnetic disk, the inner spacer member defining a plurality of first lumens and the outer spacer member defining a plurality of second lumens.

9. The audio speaker of claim 8, wherein the second lumens provide airflow paths from an ambient environment outside the audio speaker and are configured to impinge air directly on the voice coil.

10. The audio speaker of claim 8, further comprising a second inner magnetic disk and a second outer magnetic disk positioned radially outside of the second inner magnetic disk, the first and second inner magnetic disks being positioned on opposite sides of the inner spacer member, the first and second outer magnetic disks being positioned on opposite sides of the outer spacer member, the second inner magnetic disk and the second outer magnetic disk being separate from one another by a second gap region through which the voice coil extends.

11. The audio speaker of claim 10, wherein the second lumens provide airflow paths from the ambient environment outside the audio speaker and are configured to impinge air directly on areas of the voice coil extending through the first and second gap regions.

* * * * *